H. TIETJENS.
BISCUIT COATING MACHINE.
APPLICATION FILED APR. 8, 1909.

943,284.

Patented Dec. 14, 1909.

Witnesses:
Arthur G. Zumper
W. R. Schulz

Inventor
Heinrich Tietjens
By his Attorney

UNITED STATES PATENT OFFICE.

HEINRICH TIETJENS, OF HAMBURG, GERMANY, ASSIGNOR TO HANNOVERSCHE CAKES-FABRIK H. BAHLSEN, OF HANOVER, GERMANY.

BISCUIT-COATING MACHINE.

943,284.　　　　Specification of Letters Patent.　　Patented Dec. 14, 1909.

Application filed April 8, 1909.　Serial No. 488,690.

*To all whom it may concern:*

Be it known that I, HEINRICH TIETJENS, a citizen of Germany, residing at Hamburg, Germany, have invented new and useful Improvements in Biscuit-Coating Machines, of which the following is a specification.

This invention relates to machines for coating one surface of biscuits, cakes or other articles with sugar or the like, and has for its object to facilitate the coating of such articles and their removal from the band on which they are coated.

Figure 1:
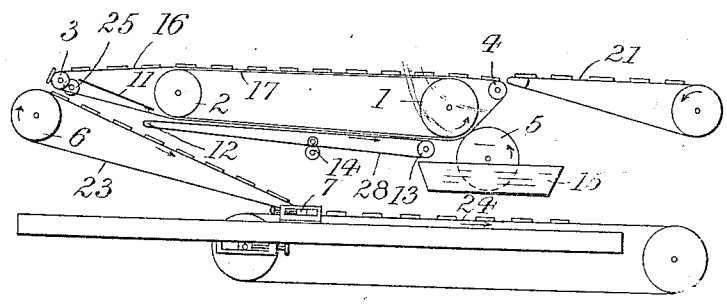
Figure 2:
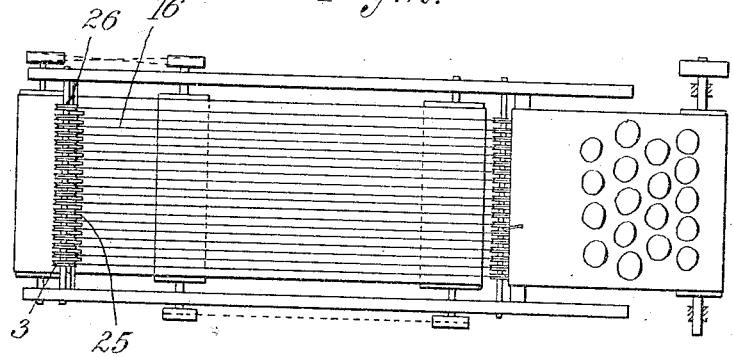

In the accompanying drawing: Figure 1 is an elevation of my machine for coating biscuits, and Fig. 2 a plan thereof.

Over rollers 1 and 2 an endless cloth 17 is stretched, above which are guided, so as to make contact with the cloth, longitudinally arranged conveyer threads 16 passing around rollers 3, 4, arranged beyond rollers 1 and 2, said threads extending some distance beyond the delivery end of cloth 17. A roller 5, dipping into icing in a tank 15, applies the coating medium uniformly to the cloth 17 and the threads 16. The biscuits are first received by a feed cloth 21 and pass over the roller 4 onto the threads 16 and the cloth 17, whereupon they adhere to the icing on the band 17 until the roller 2 is reached, after which, until they come to the roller 3, they are carried exclusively by the threads 16. At the point where the threads turn after passing over their rollers 3, the biscuits fall upon a cloth 23 that passes over roller 6, and at the same time make a turning over movement and come to lie on their uncoated surfaces. This is due to the roller 3 having a small diameter, so that the biscuits are easily detached and on coming into contact with the band 23 are turned over onto their uncoated surface since the direction of movement of the conveyer-band 23 is opposite to that of threads 16, so that its taut side acts on the edge of the biscuit on the coated side and consequently turns the biscuit about this edge over onto its uncoated surface. Below the rollers 3 and between the same, a number of rollers 25 are loosely mounted on a spindle 26, so that their peripheries project beyond the lower or returning threads 16, and any biscuits still adhering to these threads are stripped off and fall upon the cloth 23, the latter, as before, effecting the turning over of the articles. At the lower turning point 7, of band 23, the biscuits are placed onto an endless band 24 of cloth or wire netting, by means of which they are carried into a drying chamber or taken up to the drying grids.

To prevent icing which may drip off the under side of the band 17 from falling onto the biscuits already iced or onto the cloth 23, an endless band 28 is stretched around rollers 12 and 13, and driven by means of a roller 14. This cloth takes up any icing which may fall from the coating band and carries it back to the tank, where it is stripped off and into which it falls. A shield 11 is provided below the threads 16 onto which any icing from the threads falls, whence it is directed to the cloth 28. As a general rule, however, the threads do not convey sufficient icing to cause inconvenience in this respect.

It will be understood that not only biscuits but any other articles of any size can be coated by means of this machine and that the details of construction may vary considerably without departing from this invention.

I claim:

1. A machine of the character described, comprising a first pair of rollers, an endless feed apron engaging the same, a second pair of rollers placed at a greater distance from each other than the first pair of rollers, a series of longitudinally arranged endless threads engaging said second pair of rollers and extending beyond the upper run of the feed apron, and a coating roller engaging the apron.

2. A machine of the character described, comprising a first pair of rollers, an endless feed apron engaging the same, a second pair of rollers placed at a greater distance from each other than the first pair of rollers, a series of longitudinally arranged endless threads engaging said second pair of rollers and extending beyond the upper run of the feed apron, a coating roller engaging the apron, and a conveyer band arranged below the discharge ends of the threads and traveling in a direction opposite to that of the threads.

3. A machine of the character described, comprising a first pair of rollers, an endless feed apron engaging the same, a second pair of rollers placed at a greater distance from each other than the first pair of rollers, a series of longitudinally arranged endless threads engaging said second pair of rollers and extending beyond the upper run of the feed apron, a coating roller engaging the apron, and a series of stripping rollers arranged in proximity to the discharge ends of the threads.

Signed by me at Hamburg Germany this 23d day of March 1909.

HEINRICH TIETJENS.

Witnesses:
ERNEST H. L. MUMMENHOFF,
OTTO W. HELLMRICH.